United States Patent [19]

Buchanan et al.

[11] Patent Number: 5,514,351

[45] Date of Patent: May 7, 1996

[54] DESULFURIZING TAILGAS FROM SULFUR RECOVERY UNIT

[75] Inventors: John S. Buchanan, Hamilton; Jagannathan N. Iyengar, Chester; David L. Stern, Princeton, all of N.J.

[73] Assignee: Mobil Oil Corporation, Fairfax, Va.

[21] Appl. No.: 186,934

[22] Filed: Jan. 27, 1994

Related U.S. Application Data

[63] Continuation-in-part of Ser. No. 63,473, May 19, 1993, abandoned, which is a continuation of Ser. No. 868,432, Apr. 15, 1992, Pat. No. 5,229,091, which is a continuation-in-part of Ser. No. 877,936, May 4, 1992, Pat. No. 5,292,492.

[51] Int. Cl.[6] .......................... B01D 53/50; B01D 53/52
[52] U.S. Cl. .................... 423/220; 423/222; 423/224; 423/244.02; 423/244.1; 423/574.1; 423/576.8
[58] Field of Search .................... 423/222, 224, 423/237, 243.03, 244.02, 244.1, 566, 574.1, 220, 576.8

[56] References Cited

U.S. PATENT DOCUMENTS

| 3,755,535 | 8/1973 | Naber | 423/244 |
|---|---|---|---|
| 3,764,665 | 10/1973 | Groenendaal et al. | 423/574 |
| 3,835,031 | 9/1974 | Bertolacini et al. | 208/120 |
| 3,928,547 | 12/1975 | Daley et al. | 423/564 |
| 3,947,547 | 3/1976 | Groenendaal et al. | 423/242 |
| 3,966,879 | 6/1976 | Groenendaal | 423/244 |
| 3,987,154 | 10/1976 | Lagas | 423/574 |
| 4,041,131 | 8/1977 | Forbes | 423/242 |
| 4,059,418 | 11/1977 | Cull | 55/73 |
| 4,110,087 | 8/1978 | Nolley, Jr. | 55/73 |
| 4,147,763 | 4/1979 | McKinzie et al. | 423/570 |
| 4,193,894 | 3/1980 | Villadsen | 252/440 |
| 4,233,276 | 11/1980 | D'Souza et al. | 423/230 |
| 4,263,020 | 4/1981 | Eberly, Jr. | 55/62 |
| 4,323,544 | 4/1982 | Magder | 423/239 |
| 4,369,130 | 1/1983 | Bertolacini et al. | 252/455 |
| 4,376,103 | 3/1983 | Bertolacini et al. | 423/244 |
| 4,432,862 | 2/1984 | Swart et al. | 208/64 |
| 4,448,674 | 5/1984 | Bartholic | 208/113 |
| 4,459,371 | 7/1984 | Hobbs et al. | 502/341 |
| 4,462,977 | 7/1984 | Reed | 423/574 R |
| 4,469,589 | 9/1984 | Yoo et al. | 208/120 |
| 4,471,070 | 9/1984 | Siefert et al. | 502/302 |
| 4,472,267 | 9/1984 | Yoo et al. | 208/120 |
| 4,472,532 | 9/1984 | Mooi | 502/302 |

(List continued on next page.)

FOREIGN PATENT DOCUMENTS

| 790945 | 7/1968 | Canada. |
| 0110702 | 8/1988 | European Pat. Off.. |
| 0158858 | 10/1991 | European Pat. Off.. |
| 8606090 | 10/1986 | WIPO. |
| 8706156 | 10/1987 | WIPO. |

OTHER PUBLICATIONS

"Unit Processes and Principles of Chemical Engineering" by John C. Olsen; New York D. Van Nostrand Co. Inc. (1932) pp. 1–3.

Primary Examiner—Gary P. Straub
Assistant Examiner—Timothy C. Vandy
Attorney, Agent, or Firm—A. J. McKillop; D. P. Santini; G. L. Harris

[57] ABSTRACT

With sufficient oxygen but with no added fuel gas, recovering sulfur from a gas stream containing hydrogen sulfide by oxidizing the gas stream with heat exchange from heat generated in a thermal converter section of a sulfur recovery unit to convert the hydrogen sulfide in the gas stream to sulfur oxide, and thus form a sulfur oxide enriched gas stream. The sulfur oxide enriched gas stream is contacted with a solid adsorbent bed to extract the sulfur oxides and retain them as sulfur compounds, thus forming a sulfur oxide depleted gas stream. The adsorbent bed is then contacted with a reducing gas stream to reduce the retained sulfur compounds to hydrogen sulfide and/or sulfur dioxide and thereby form a hydrogen sulfide and/or sulfur dioxide bearing stream. Sulfur is recovered from the hydrogen sulfide and/or sulfur dioxide bearing stream, and the sulfur oxide depleted gas stream maybe sent to an incinerator or vented through a stack.

28 Claims, 2 Drawing Sheets

U.S. PATENT DOCUMENTS

| | | | |
|---|---|---|---|
| 4,476,245 | 10/1984 | Siefert | 502/302 |
| 4,478,808 | 10/1984 | Matros et al. | 423/522 |
| 4,492,677 | 1/1985 | Yoo et al. | 423/244 |
| 4,492,678 | 1/1985 | Yoo et al. | 423/244 |
| 4,520,003 | 5/1985 | Petersson et al. | 423/533 |
| 4,522,937 | 6/1985 | Yoo et al. | 502/302 |
| 4,575,453 | 3/1986 | Reed | 422/149 |
| 4,613,428 | 9/1986 | Edison | 208/113 |
| 4,617,175 | 10/1986 | Tolpin et al. | 422/171 |
| 4,642,178 | 2/1978 | Yoo et al. | 208/113 |
| 4,643,887 | 2/1987 | Daley et al. | 423/533 |
| 4,690,806 | 9/1987 | Schorfheide | 423/230 |
| 4,692,318 | 9/1987 | Tolpin et al. | 423/239 |
| 4,728,635 | 3/1988 | Bhattacharyya et al. | 502/304 |
| 4,735,705 | 4/1988 | Burk, Jr. et al. | 208/113 |
| 4,790,982 | 12/1988 | Yoo et al. | 423/239 |
| 4,826,664 | 5/1989 | Kay et al. | 423/21.1 |
| 4,830,733 | 5/1989 | Nagji et al. | 208/208 |
| 4,836,993 | 6/1989 | Bertolacini et al. | 423/244 |
| 4,857,285 | 8/1989 | Gal | 423/230 |
| 4,857,296 | 8/1989 | Brunelle et al. | 423/574 |
| 4,857,297 | 8/1989 | Kettner et al. | 423/576.8 |
| 4,865,826 | 9/1989 | Carnell et al. | 423/230 |
| 4,918,036 | 4/1990 | Rheaume et al. | 502/66 |
| 4,963,520 | 10/1990 | Yoo et al. | 502/64 |
| 4,994,257 | 2/1991 | Suehiro et al. | 423/577 |
| 5,034,369 | 7/1991 | Hebrard et al. | 502/304 |
| 5,037,629 | 8/1991 | Berben et al. | 423/576.8 |
| 5,108,979 | 4/1992 | Magnabosco et al. | 502/304 |
| 5,116,798 | 5/1992 | Fennemann | 502/218 |
| 5,292,492 | 3/1994 | Buchanan et al. | 423/222 |

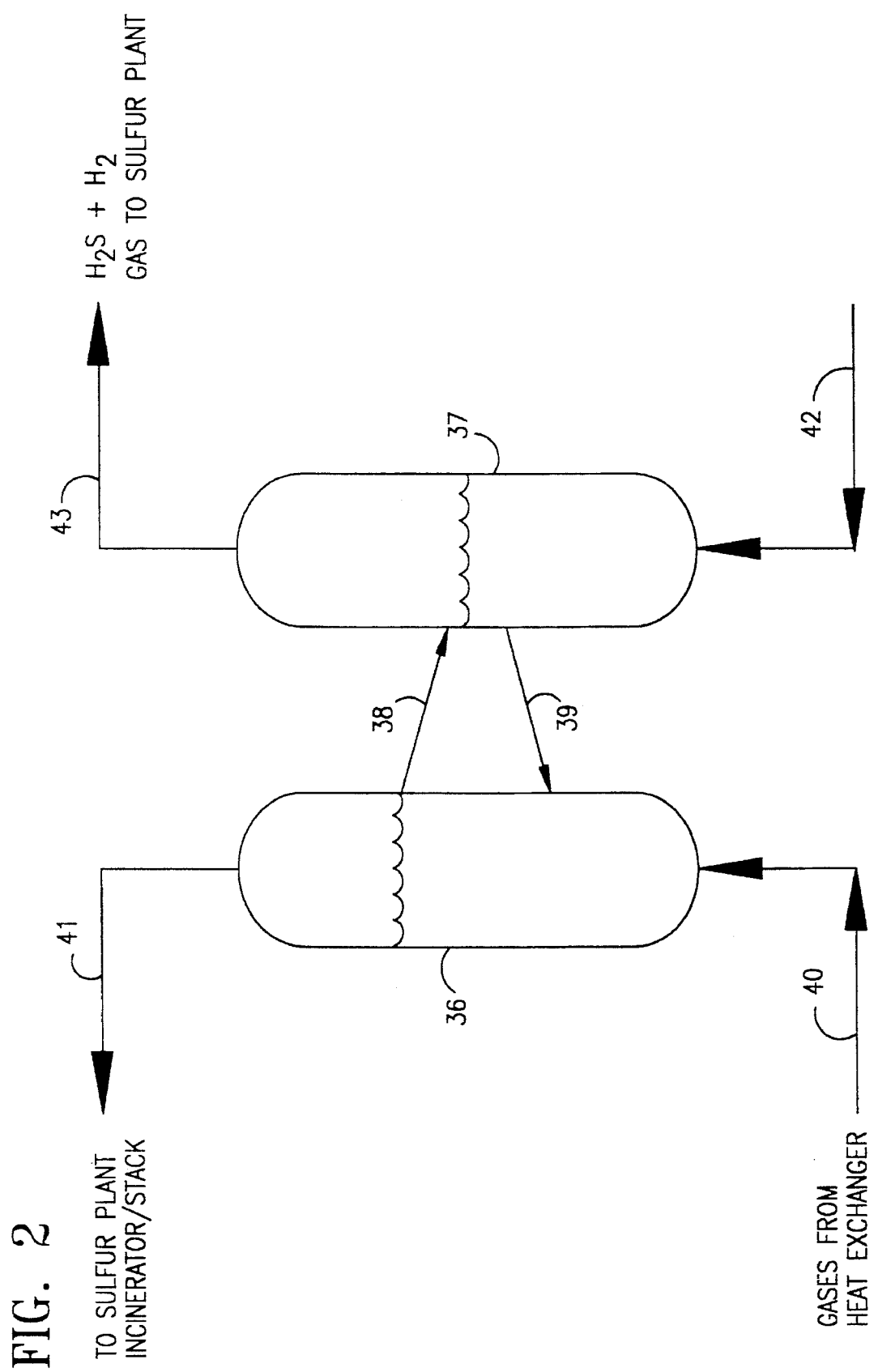

DESULFURIZING TAILGAS FROM SULFUR RECOVERY UNIT

CROSS-REFERENCE TO RELATED APPLICATIONS

This application is a continuation-in-part of application Ser. No. 08/063,473, filed May 19, 1993 now abandoned, which is a continuation of application Ser. No. 07/868,432, filed Apr. 15, 1992, and now U.S. Pat. No. 5,229,091. This application is also a continuation-in-part of application Ser. No. 07/877,936, filed May 4, 1992, and now U.S. Pat. No. 5,292,492.

BACKGROUND OF THE INVENTION

1. Field of the Invention

The present invention relates to a process and a system for extracting sulfur from a gas stream containing hydrogen sulfide. More particularly, the present invention relates to a process and a system for desulfurizing exhaust gas from a Claus unit using solid adsorbent.

2. Description of Prior Art

Refinery streams are typically desulfurized by the Claus process wherein elemental sulfur is produced by reacting hydrogen sulfide and sulfur dioxide in the presence of a catalyst. The Claus system uses a combustion chamber which, at 1,800° F. to 2,800° F. converts 50 to 70% of sulfur contained in the feed gas into elemental sulfur. Sulfur is condensed by cooling the reaction gas to a temperature below the dew point of sulfur after which the remaining gas is heated and further reacted over a catalyst. Normally, the gas passes through at least two such Claus catalyst stages.

The different stages of the process may be represented by the following equations:

$$H_2S + 3/2O_2 \rightarrow SO_2 + H_2O$$

$$2H_2S + SO_2 \rightarrow 3S + 2H_2O$$

The overall reaction is:

$$3H_2S + 3O_2 \rightarrow 3S + 3H_2O$$

The final Claus exhaust gas still contains small amounts of $H_2S$, $SO_2$, $CS_2$, carbon oxysulfide, CO, and elemental sulfur in the form of a vapor or mist. The exhaust gas can be subjected to post-combustion to convert substantially everything to $SO_2$ and then further purified by Claus aftertreatments.

An aftertreatment process which oxidizes all sulfur compounds into $SO_2$ is disclosed in U.S. Pat. No. 3,764,665. This patent disclosed a process for removing sulfur oxides from gas mixtures with a solid acceptor for sulfur oxides wherein the solid acceptor is regenerated with a steam-diluted reducing gas and the regeneration off-gas is fed to a Claus sulfur recovery process. The patent provides for cooling the regeneration off-gas to condense the water vapor contained therein, contacting the cooled off-gas with a sulfur dioxide-selective liquid absorbent, passing the fat liquid absorbent to a buffer zone and then to a stripping zone wherein the absorbed $SO_2$ is recovered from the liquid absorbent and is supplied to the sulfur recovery process. By operating in this manner, fluctuations in the sulfur dioxide concentration of the regeneration off-gas were leveled-out and a relatively concentrated sulfur dioxide stream was supplied to the sulfur recovery process at a substantially constant rate. Although this process supplies relatively concentrated sulfur dioxide to the sulfur recovery process at a substantially constant rate, the off-gas must be cooled and the fat liquid absorbent must be transferred to a buffer zone before the absorbed $SO_2$ can be stripped. Therefore, what is needed is a simpler process whereby these steps are eliminated and energy costs reduced.

SUMMARY OF THE INVENTION

This invention is directed to a process for removing low concentrations of sulfur from a gas stream. In accordance with a broad aspect of the present invention, there is provided a method of recovering sulfur from a hydrogen sulfide containing gas stream, e.g. from an elemental sulfur recovery unit, comprising the steps of with no added fuel gas oxidizing the gas stream by heat exchange with heat generated in a thermal converter of a sulfur recovery unit (e.g. a Claus plant) to convert the hydrogen sulfide therein to sulfur oxide, and thus form a sulfur oxide enriched gas stream. The sulfur oxide enriched gas stream is contacted with a solid adsorbent bed to extract the sulfur oxides and retain them as sulfur compounds, thus forming a sulfur oxide depleted stream. The sulfur compounds are retained in the bed in the form of inorganic sulfates, sulfur oxides or combinations thereof. The adsorbent bed is then contacted with a reducing gas stream to reduce the retained sulfur compounds to hydrogen sulfide and/or sulfur dioxide and thereby form a hydrogen sulfide and/or sulfur dioxide bearing stream. The reducing step contemplates that hydrogen sulfide and sulfur dioxide may react during some portion of regeneration to form a minor amount of elemental sulfur and/or COS which does not adversely affect the process. Sulfur is recovered from the hydrogen sulfide and/or sulfur dioxide bearing stream, and the sulfur oxide depleted stream may be sent to an incinerator or vented through a stack.

In accordance with another broad aspect of the present invention, there is provided a system for recovering sulfur from a hydrogen sulfide containing gas stream, e.g. from an elemental sulfur recovery unit, comprising means for oxidizing the gas stream by heat exchange with the effluent of the unit's thermal converter to convert the hydrogen sulfide to sulfur oxide, and thus form a sulfur oxide enriched gas stream. Means are also provided for contacting the sulfur oxide enriched gas stream with an adsorbent bed to extract the sulfur oxides and retain them as inorganic sulfates, sulfur oxides or combinations thereof, and thus form a sulfur oxide depleted gas stream. The system also includes means for contacting the sulfur compounds retained by the bed with a reducing gas stream to reduce the retained sulfur compounds to hydrogen sulfide and/or sulfur dioxide, and thereby form a hydrogen sulfide and/or sulfur dioxide bearing stream. Means are also provided for recovering sulfur from the hydrogen sulfide and/or sulfur dioxide bearing stream.

In accordance with a specific aspect of the present invention, the oxidizing means includes a heat exchanger using heat generated in a thermal converter section of a sulfur recovery unit (Claus plant) for heating and converting the hydrogen sulfide containing exhaust gas stream. The hot gases are then contacted with Mg/Al spinels where the sulfur oxide reacts with the spinel to form inorganic sulfates or sulfur oxides or combinations thereof. Complete or near complete removal of sulfur oxide is achieved. The spinels are then contacted with a reducing stream containing hydrogen and/or hydrocarbon, or a mixture of carbon monoxide and hydrogen, whereby the sulfates and/or sulfur on the spinels are reduced to $H_2S$ and/or sulfur dioxide. This gas stream containing only $H_2S$ and/or sulfur dioxide, water and unreacted $H_2$ is then sent to the sulfur plant for combustion and sulfur recovery.

BRIEF DESCRIPTION OF THE DRAWINGS

FIG. 2 is a schematic flow diagram of a fluidized bed system for recovering sulfur in accordance with another embodiment of the present invention.

DESCRIPTION OF SPECIFIC EMBODIMENTS

Figure 1:
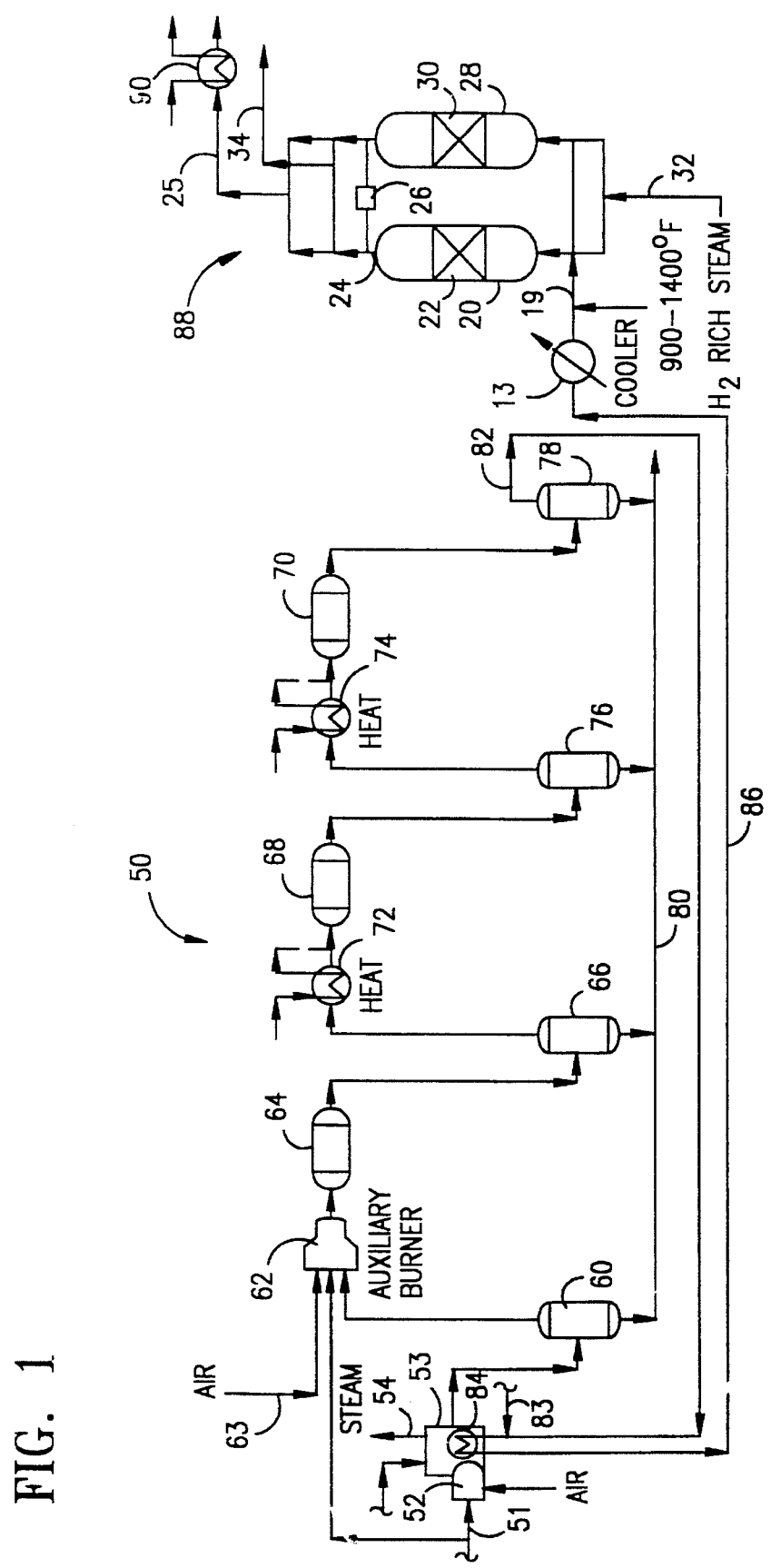
FIG. 1 is a schematic flow diagram of a fixed-bed system for recovering sulfur from a hydrogen sulfide containing gas in accordance with the present invention.

Claus gas typically has high concentrations of hydrogen sulfide, for example hydrogen sulfide concentrations of between 50% and 85% depending on plant and pretreatment processes. The pretreatment process may be an amine treater which provides a concentrated hydrogen sulfide output stream (acid gas). The Claus reaction is also limited to gases of relatively low hydrogen content. The Claus gas is fed by a line 51 to a reaction furnace (thermal converter) 52 of the Claus plant 50. The hydrogen sulfide is combusted therein with air until low concentrations of hydrogen sulfide and sulfur dioxide are detected at the outlet of the combustion chamber 52. Sufficient air is added to the furnace 52 to burn all the hydrocarbon gases present and, in addition, convert at least about one third of the hydrogen sulfide contained in the gas to sulfur oxide. The air supply to the Claus furnace 52 is typically controlled so as to yield a hydrogen sulfide to sulfur dioxide ratio of about 2:1 in the effluent from the final Claus reactor 82 to maximize conversion to elementary sulfur in the Claus plant. The heat thus generated is used to make high pressure steam 54 in a waste heat boiler 53. The gas leaving the waste heat boiler 53 is cooled in a first condenser 60 to condense and remove sulfur prior to a first reactor 64.

As a result of this cooling, the gases leaving the condenser 60 are below the minimum temperature required for reaction, and it is, therefore, necessary to raise this temperature to a suitable level by, for example, a hot-gas bypass, an in-line burner (using acid gas or fuel gas), or gas to gas or steam exchangers. The gas leaving the condenser 60 is reheated in an in-line burner 62 prior to entering the first catalytic reactor 64 where the hydrogen sulfide and sulfur dioxide react to form sulfur. The sulfur formed in the first reactor 64 is removed by a second condenser 66.

The second and third conversion stages each include a reactor 68,70 for converting $H_2S$ and $SO_2$ to sulfur, and also a heat exchanger 72,74 for raising the temperature of the feed stream to the reactor, and a condenser 76,78 for removing sulfur from the stream. The second and third stages function in the same manner as the first stage. All the condensed sulfur from the stages flows through a line 80 to a sulfur storage (not shown).

The gas in a line 82 from the final condenser 78 flows to a tail gas treating unit in accordance with the present invention.

The tailgas in the line 82 is passed to and heated to about 1200° F. by a heat exchanger 84 which utilizes the heat generated in the waste heat boiler 53 of the thermal converter section 52. Air or oxygen is added to the stream 82 by a line 83 in an amount sufficient to oxide all sulfur containing species to sulfur dioxide and to provide from about 0.1 to about 10% oxygen in the feed to the heat exchanger 84. Oxidation of hydrogen sulfide to sulfur oxide takes place in the heat exchanger 84 to form sulfur oxide enriched stream which is passed by a line 86 to the tailgas treating unit 88.

An incinerator may be used to heat the tailgas to a preferred temperature of about 1200° F., and mix in sufficient air to the stream to obtain from about 0.1% to about 10.0%, preferably from about 1.0 to about 5.0%, excess oxygen. Both the elevated temperature and excess oxygen are needed for optimal sorption on preferred promoted metal oxides. Fuel gas, consisting mainly of $C_1$–$C_4$ hydrocarbons, is generally the most economical fuel for firing an incinerator.

However, when an incinerator is used, there is a constant consumption of fuel gas. Water and $CO_2$ generated by combustion in the incinerator increase the total flow rate through the adsorbent bed, decreasing its efficiency. Also, the presence of $CO_2$ in the sorbent gas mixture tends to inhibit sorption of $SO_2$. A certain amount of $CO_2$ is sorbed by the solids, and is subsequently released into the off-gas during regeneration. This $CO_2$ increases the volume of the off-gas, which can reduce the feed capacity of the Claus plant when the off-gas is fed to the front of the Claus plant.

The system of the present invention shown in FIG. 1, wherein the tailgas is heated by the heat exchanger 84 in the thermal converter section 52 of the Claus plant, offers improvements in all of these areas. The temperatures in the thermal converter can be over 2000° F., and heat exchange is necessary to reduce the temperature of the effluent for further processing in the Claus catalyst beds. Conventionally, the heat removed in the thermal converter is used to generate high pressure (approx. 600 psi) steam. In the present invention, part or all of the heat exchange capacity in the thermal converter may be used to heat the tailgas to a preferred sorption temperature of about 1,200° F. before it is fed to a sorption bed in the tailgas treating unit 88. Part of the heat exchange capacity in the thermal converter 52 can still be used for steam generation, because heat consumed in heating the tailgas from about 300° F. in line 82 to about 1200° F. in line 86 will generally be less than the heat removal required to drop the thermal converter effluent from about 2300° F. to about 650° F. needed for processing in the first condenser 60. The continued generation of some high pressure steam in this region may have operational benefits.

Other advantages of a heat exchanger over a combuster to convert hydrogen sulfide to sulfur oxide in accordance with the present invention are that combuster requires substantial amounts of methane and of air to combust the methane. Also, a flame must be maintained in the combuster. This is a relatively complex and expensive apparatus because safety problems necessitate a significant amount of instrumentation. On the other hand, the heat exchange system of present invention requires only an array of tubes in a region where only a very small amount of air is needed to combust the relatively small amount of hydrogen sulfide. This combustion will occur with only a small rise in temperature in comparison to that of a combuster. Thus, with regard to the complexity and expense of hardware, it is much more simple and inexpensive to use the heat exchanger mode of the present invention.

As discussed above, high pressure steam is normally generated in the Claus boiler 84, and thus steam is a valuable product of the Claus process. By using this heat exchange capacity in the Claus boiler for the present invention to heat the Claus tailgas from about 300° F. to about 1,200° F., there will be less high pressure steam made in the Claus boiler. However, in accordance with a specific aspect of the present invention to be described hereinafter, this loss of high pressure steam capacity is at least substantially recovered by the use of a heat exchanger for steam generation after an adsorption bed in the tailgas treating unit 88. In this manner, heat exchange of the output stream of the adsorption bed(s) will recoup at least 70% of the high pressure steam capacity lost by use of the heat exchanger in the Claus boiler.

As described above, the hydrogen sulfide containing tailgas gas stream 82 from the elemental sulfur recovery unit 50 is fed to the heat exchanger 84 to completely convert hydrogen sulfide to sulfur oxides. A sulfur oxide enriched gas stream 86 from the heat exchanger 84 is cooled in another heat exchanger 13 to within a range of from about 900° F. to about 1400° F. and is fed by a line 19 to a first fixed-bed reactor 20 containing a solid adsorbent bed 22. The output of the heat exchanger 13 can be used to make-up a portion of the high pressure steam capacity lost by use of the heat exchanger 84 in the Claus boiler 53.

The solid adsorbent bed 22 adsorbs substantially all of the sulfur oxide from the sulfur oxide enriched gas stream 86, and provides a sulfur oxide depleted gas stream through an outlet conduit 24. The sulfur oxide depleted stream is fed through a valve system (not shown) to a line 25 leading to an incinerator or to a stack.

A heat exchanger 90 for steam generation is located in the line 25 to extract heat from the sulfur oxide depleted stream. In this manner, heat exchange of the output stream of the adsorption bed(s) will recover at least 70% of the high pressure steam capacity lost by use of the heat exchanger 84 in the Claus boiler 53.

While in an adsorbent mode, the reactor 20 is operated at a temperature from about 900° F. to about 1,400° F. A temperature of from about 1,100° F. to about 1,300° F. is preferred. The oxygen content of the stream 19 entering the adsorbent bed 22 is in an amount of from about 0.10 to about 10 vol %, preferably from about 2 to about 4 vol %. Air supplied by the line 83 may be the source of this oxygen. Pressure within the reactor 20 should be maintained at a pressure of from about 0.1 to about 10 atmospheres, preferably from about 1.5 to about 3.0 atmospheres. GHSV should be from about 500 to about 20,000, and preferably from about 3,000 to about 5,000 GHSV. An additional benefit of operating the reactor 22 during the adsorbent mode within these parameters is that any carbon monoxide therein is converted into carbon dioxide which is released into the environment. Other gases released from the reactor 20 include nitrogen, oxygen, and trace amounts of sulfur dioxide along with water.

The adsorbent can be in the form of balls, pebbles, spheres, extrudates, channeled monoliths, microspheres or pellets. This sulfur oxide-capturing adsorbent provides absorbers or acceptors which absorb, and collect, or otherwise remove sulfur oxides from the influent gaseous stream. In one embodiment, the bed 22 is Mg/Al spinels.

The outlet conduit 24 is monitored by a sensor 26 until sulfur dioxide break-through occurs. A suitable sensor is a Siemens Ultramat 22P infrared analyzer. Of course, as will be understood by those skilled in the art, other comparable analyzing equipment can be used.

Sulfur dioxide break-through occurs when a substantial increase in the concentration of sulfur dioxide occurs in the conduit 24. This increase will be in the order of from about 3 ppm to about 250 ppm in less than about 2 minutes.

When sulfur dioxide break-through is detected, the sulfur oxide enriched gas stream 86 is directed through a suitable valve system (not shown) into a second fixed-bed reactor 28 having a solid adsorbent bed 30 therein. Concurrently, the valve system directs a hydrogen rich stream 32 to the first reactor 20 for regenerating the first adsorbent bed 22. The hydrogen rich reducing gas stream 32 may contain hydrogen and/or hydrocarbons, or syngas (CO and $H_2$).

During regeneration of the adsorbent bed 22 the temperature is maintained between about 900° F. to about 1,400° F.; and the pressure in the reactor 20 is maintained at about 0.10 to about 10 atmospheres, preferably about 0.5 to about 3 atmospheres. The reducing gas stream 32 is directed into the reactor 20 at a gas hourly space velocity (GHSV) of about 10 to about 1,000, preferably about 100 to about 150. Initially, a GHSV of about 300 is preferred when commencing regeneration of a fixed-bed adsorbent so that a higher concentration of liberated gases can be removed from the regenerator. As regeneration proceeds, the GHSV can be reduced to about 50 as the concentration of liberated gases diminishes. Similarly, although hydrogen is the preferred reducing gas for regeneration, other hydrocarbon reducing gases can be used. These will preferably comprise $C_1$ through $C_5$ hydrocarbons. Substantially improved regeneration results are anticipated when water is co-fed into the reactor along with the hydrocarbons. The $H_2$ and/or hydrocarbon stream 32 may contain 0.0 to 50% water.

The invention contemplates that the reducing gas can alternatively be back-flowed through the beds in a direction opposite the flow direction of the sulfur oxide enriched stream through the beds. This would ensure that the last part of the bed that the sulfur oxide enriched stream sees is very active.

Regeneration of the bed 22 provides a hydrogen sulfide and/or sulfur dioxide bearing stream through the outlet conduit 24, the valve system (not shown), and via line 34 to the sulfur plant 50 for recovery of sulfur. The hydrogen sulfide and/or sulfur dioxide bearing stream may also contain water and unconverted reducing gas.

The sulfur oxide enriched stream 86 and the hydrogen rich reducing stream 32 are alternately fed to each one of the reactors 20,28, whereby each bed 22,30 is first spent by sulfur oxides extracted from the stream 86, and then regenerated by the hydrogen rich reducing stream 32.

With reference to FIG. 2, there is shown a fluidized bed system comprising a reactor 36, a regenerator 37, a conduit 38 for feeding spent adsorbent from the reactor 36 to the regenerator 37, and another conduit 39 for passing a fluidized bed of regenerated adsorbent from the regenerator 37 to the reactor 36. A sulfur oxide enriched stream 40 from the heat exchanger 84 (FIG. 1) is fed to the lower end of the reactor 36, over adsorbent therein to strip out the sulfur oxides and provide a sulfur oxide depleted stream 41 for the incinerator or the stack. A hydrogen bearing stream 42 is fed to the bottom of the regenerator 37 to reduce the sulfur compounds on the spent adsorbent to hydrogen sulfide and form a hydrogen sulfide and/or sulfur dioxide bearing outlet stream 43.

Operating parameters for the fluidized system are substantially the same as those described above with respect to the FIG. 1 fixed-bed embodiment. Further, the operating conditions for the heat exchanger 84 are similar when using either the fluidized or fixed bed systems. The temperature in the fluidized bed reactor 36 is maintained at from about 900° F. to about 1,400° F., preferably between about 1,100° F. to about 1,300° F. The oxygen content of the stream 40 introduced into the reactor 40 is maintained in an amount of from about 0.1 to about 10 vol %, preferably 2 to about 4 vol %. Pressure in the reactor 36 should be maintained at about 0.1 to about 10 atmospheres, preferably about 1.5 to about 3 atmospheres. The GHSV should be maintained at about 400 to about 7,000, preferably about 500 to about 2,500.

The safest place to send gas being regenerated by the bed(s) is the Claus burner along with the acid gas to insure combustion of any hydrocarbon gas that may come off the bed(s) with the regenerated gas during regeneration. When using pure hydrogen as a reducing gas, it would be possible to send the stream from the bed(s) to the front of the first waste heat boiler 54 ahead of the first Claus reactor 56. This boiler would cool the gases from about 1,200° F. down to about 600°–700° F. or to the design optimal temperature for the first reactor 64. The species of $H_2S$ and $SO_2$ could be converted in the first reactor 64. However, the general rule would be to send whole output stream from the regenerated bed(s) back to the Claus boiler 52.

When hydrogen is the reducing gas for regeneration, the regeneration off-gas may be fed to one of the catalytic converters 64, 68, 70 downstream of the thermal converter 52. The off-gas in this case will consist mainly of $SO_2$, hydrogen, water, and unconverted hydrogen. However, if the reducing gas for regeneration is fuel gas rather than hydrogen, the off-gas must be fed to the thermal converter (burner) 52 of the Claus plant to convert any hydrocarbons to $CO_2$, and thereby prevent the Claus catalyst from coming into contact with hydrocarbons which foul the catalyst.

An example of the competitive effect of $CO_2$ on $SO_2$ sorption will now be described. A magnesium aluminate spinel, promoted with 100 ppm platinum, was used to adsorb $SO_2$ from a gas stream consisting of about 1% $SO_2$, 4% $O_2$ and the balance $N_2$, plus about 20% water vapor at 1,200° F. Under these conditions, the material sorbed about 31.7 wt % SOx, calculated as $SO_3$. When the $N_2$ portion of the gas stream was changed to a 19% $CO_2/N_2$ mixture, the SOx sorption dropped to 22.6 wt %. An increased amount of $CO_2$ in the regeneration off-gas was observed with the 19% $CO_2/N_2$ case, although the amount of desorbed $CO_2$ was not quantified. This example illustrates the potential benefit of reducing the amount of $CO_2$ in the gas stream from which $SO_2$ is to be adsorbed.

Table 1 shows idealized but representative gas flows for a 300 long ton/day sulfur plant, in which the incoming acid gas consists of hydrogen sulfide, $NH_3$, and water. A number of simplifying assumptions are incorporated in these calculated flows, and minor components are omitted. The flows into the solid bed absorber would consist of those shown in the fourth column ("Tailgas after Incineration") for an incinerator system, and the fifth column for the heat exchanger embodiment of FIG. 1. In both cases, the oxygen content is 4%. Using an incinerator instead of heat exchange increases the molar flow rate from 5,961 to 7,818 lb-mol/hr, an increase of about 31%. These results demonstrate that this increase in flows will result in decreased efficiency in $SO_2$ sorption.

TABLE 1

Gas Flows (lb-mol/hr) for 300 Long Ton/Day Sulfur Plant.
(Minor components, e.g. COS and uncondensed S are neglected)

|  | FEED TO CLAUS BURNER | AFTER COMBUSTION | TAILGAS AFTER CLAUS | TAILGAS AFTER INCINERATION* | TAILGAS PLUS 4% EXCESS $O_2$** |
| --- | --- | --- | --- | --- | --- |
| $H_2S$ | 875 | 583 | 18 | — | — |
| $SO_2$ | — | 292 | 9 | 27 | 27 |
| $N_2$ + Ar | 2800 | 2975 | 2975 | 5396 | 4034 |
| $O_2$ | 700 | — | — | 312 | 238 |
| $H_2O$ | 262 | 1079 | 1645 | 1937 | 1662 |
| $NH_3$ | 350 | — | — | — | — |
| $CO_2$ | — | — | — | 146 | — |
| Total | 4987 | 4929 | 4647 | 7818 | 5961 |

*Calculations for gas composition after incineration with $CH_4$ are quite simplified. Assumptions include constant heat capacity of 8 Btu/lb-mol, and heat of combustion of $CH_4$ = 383,000.
**For Heat Exchange Option.

ADSORBENTS

Non-limiting examples of suitable solid adsorbents for use in the present invention include the porous solids, alumina, silica, silica-alumina, natural and synthetic zeolites, activated carbon, spinels, clays, and combinations thereof. Gamma alumina, chi-eta-rho alumina, delta alumina, and theta alumina are particularly useful as adsorbents and supports because of their high surface areas.

While alpha alumina and beta alumina can be used as adsorbents, they are not as effective as gamma, chi-eta-rho, delta and theta alumina. One or more oxides of other metals can also be used as adsorbents, either alone or in combination with alumina or as spinels, such as bismuth, manganese, yttrium, antimony, tin, copper, Group IA metals, Group IIA metals, rare earth metals, and combinations thereof. Magnesium aluminate spinels are particularly useful as adsorbents. These may be magnesium or aluminum rich with magnesium aluminate spinels preferred. Lanthanum and cerium are preferred rare earth metals. Naturally occurring rare earths, such as in the form of baestenite, are also useful adsorbents. Elemental copper or copper compound adsorbents, such as copper oxide adsorbents, can also be used. The copper oxide can be cuprous oxide and/or cupric oxide. Other copper compounds can be used, such as copper (II) sulfate, copper (II) acetate, copper (II) formate, copper (II) nitrate and/or copper (II) chloride. The adsorbents can also be a blend/mixture of high density and low density materials.

Also, a metal or metal oxide may be deposited on the solid adsorbent or may be used alone. The metal or metal oxide part of the adsorbents can be supported, carried and held on a refractory support or carrier material which also provides part of the adsorbents. The support controls the attrition and surface area characteristics of the adsorbents. The support preferably has a surface area greater than about 10 $m^2/g$ and most preferably from about 50 $m^2/g$ to about 500 $m^2/g$ for best results. Suitable supporters include, but are not limited to, silica, alumina, kaolin or other clays, diatomaceous earth, boria, and/or mullite. The support can comprise the same material as the metal or metal oxide part of the adsorbents.

The adsorbents can be impregnated or otherwise coated with at least one oxidizing catalyst or promoter that promotes the removal of nitrogen oxides, the oxidation of $SO_2$ to $SO_3$ in the presence of oxygen, and the regeneration of the sorbent. It is believed that $SO_3$ is more readily adsorbed than $SO_2$. One useful catalyst is ceria (cerium oxide). Another useful catalyst is platinum. Other catalytic metals, both free and in combined form, preferably as an oxide form, can be used, either alone or in combination with each other or in combination with ceria and/or alumina, such as rare earth metals, metals from Group 8 of the Periodic Table, chromium, vanadium, rhenium, tungsten, silver and combinations thereof. The promoter can comprise the same material as the adsorbent. An even distribution of the promoter is preferred for best results and to minimize adsorbent erosion.

Useful Group IA metals include lithium, sodium, potassium, rubidium, and cesium. Useful Group IIA metals include magnesium, calcium, strontium, and barium. Useful Group VIII metals are the Group VIII noble metals (the platinum family of metals) including ruthenium, rhodium, palladium, osmium, iridium, and platinum. The rare earth metals are also useful and are referred to as the lanthanides. Suitable rare earth metals include cerium, praseodymium, neodymium, samarium, europium, gadolinium, terbium, dysprosium, holmium, erbium, thulium, ytterbium, and lutetium.

Preferably, the promoter may be selected from the rare earth metals, the platinum group metals and mixtures thereof. Particularly good results are achieved when the promoter is cerium and/or platinum, with cerium giving outstanding results.

A second promoter, if present, may be selected from the metal or the metal oxide form of iron, nickel, titanium, chromium, manganese, cobalt, germanium, tin, bismuth, molybdenum, antimony, vanadium and mixtures thereof. More preferably, the second promoter is selected from iron, nickel, cobalt, manganese, tin, vanadium and mixtures thereof. Additional metals may be also incorporated into the sorbent. For example, the sorbent may include small or trace amounts of additional metals or metal oxides, such as lanthanum, iron, sodium, calcium, copper, and titanium.

The specific amounts of the promoters included in the solid sorbent, if present at all, may vary widely. Preferably, the first promoter is present in an amount between about 0.001% to about 20% by weight, calculated as elemental metal, of the solid sorbent, and the second promoter is present in an amount between about 0.001% to about 10% by weight, calculated as elemental metal, of the solid sorbent. Preferably, the solid sorbent includes about 0.1% to about 20%, more preferably about 0.2% to about 20%, and still more preferably about 0.5% to about 15%, by weight of rare earth metal, calculated as elemental metal. Of course, if a platinum group metal is employed in the solid sorbent, very much reduced concentrations (e.g., in the parts per thousand to parts per million (ppm) range) are employed. If vanadium is included as the second promoter, it is preferably present in an amount of about 0.01% to about 7%, more preferably about 0.1% to about 5%, and still more preferably about 0.5% to about 2% by weight of vanadium, calculated as elemental metal.

The promoters may be associated with the solid sorbent using any suitable technique or combination of techniques; for example, impregnation, coprecipitation, ion-exchange and the like, well known in the art. Also, the promoters may be added during synthesis of the sorbent. Thus, the promoters may be an integral part of the solid sorbent or may be in a phase separate from the solid sorbent (e.g., deposited on the solid sorbent) or both. These metal components may be associated with the solid sorbent together or in any sequence or by the same or different association techniques. Cost considerations favor the preferred procedure in which the metal components are associated together with the sorbent. Impregnation may be carried out by contacting the sorbent with a solution, preferably an aqueous solution, of the metal salts.

It may not be necessary to wash the sorbent after certain soluble metal salts (such as nitrate, sulfate or acetate) are added. After impregnation with the metal salts, the sorbent can be dried and calcined to decompose the salts, forming an oxide in the case of a nitrate, sulfate or acetate.

The above-mentioned adsorbents are discussed in U.S. Pat. No. 4,692,318, which patent is hereby incorporated herein by reference.

In one general aspect, the present invention may involve use of a sorbent which is represented by the following empirical formula: $Mg_xAl_yO_z$, where the atomic ratio of x to y ranges from about 0.1 to about 10, and where z is at least as required to accommodate the valances of the Mg and Al components of the sorbent. This sorbent may have the spinel structure, and may contain one or both promoters described above.

Metal-containing spinels according to the above empirical formula that are useful in the present invention include the alkaline earth metal spinels, in particular magnesium (first metal) and aluminum (second metal)-containing spinel. Other alkaline earth metal ions, such as calcium, strontium, barium and mixtures thereof, may replace all or a part of the magnesium ions. Similarly, other metal ions, such as iron, chromium, vanadium, manganese, gallium, boron, cobalt, Group IB metals, Group IV metals, Group VA metals, the platinum group metals, the rare earth metals, Te, Nb, Ta, Sc, Zn, Y, Mo, W, Tl, Re, U, Th and mixtures thereof, may replace all or a part of the aluminum ions, preferably only a part of the aluminum ions.

The metal-containing spinels useful in the present invention may be derived from conventional and well known sources. For example, these spinels may be naturally occurring or may be synthesized using techniques well known in the art. Thus, a detailed description of such techniques is not included herein. A particularly useful process for preparing the solid sorbent is presented in U.S Pat. No. 4,728,635, the specification of which is incorporated by reference herein.

The Group IA, IIA, IB metals, Group IIB metals, Group IV metals, Group VA metals, Group VIA, and Group VIII metals referred to herein are those listed in the Periodic Table of the Elements in the *Handbook of Chemistry and Physics* (61st Edition).

Free magnesia and/or alumina (i.e., apart from the alkaline earth metal containing spinel) also may be included in the present solid sorbent, e.g., using conventional techniques. For example, in one embodiment, the solid sorbent preferably includes about 0.1% to about 30% by weight of free magnesia (calculated as MgO).

As mentioned above, potential solid adsorbents are magnesia rich, magnesium aluminate spinels. One example of such a spinel is a commercial magnesia rich, magnesium aluminate spinel containing 0 to 100 wt. % excess magnesia, 5 to 15 wt. % cerium, and 1 to 5 wt. % vanadium. These adsorbents are substantially described in U.S. Pat. Nos. 4,790,982; 4,472,267; and 4,469,589. The disclosures of U.S. Pat. Nos. 4,790,982; 4,472,267; and 4,469,589 are hereby incorporated herein by reference. Another particularly suitable adsorbent is a magnesium-aluminum spinel with excess magnesia (MgO), and with added RE and other metals, particularly with about 13 wt % RE, about 0.5 wt % La, about 13 wt % $CeO_2$ and about 1.5 wt % V in a 1/16" extrudate. In general, the magnesium aluminate spinels useful in the present invention may be prepared by methods which are conventional and well known in the art.

The following examples are illustrative of sorbents suitable for use in the reactor beds of the present invention.

EXAMPLE 1

A ceria/alumina sorbent was prepared by impregnating high pore value gamma alumina (1/8" extrudate from Dycat International) with a solution of 32.7 grams $Ce(NO_3)_6 \cdot 6H_2O$ from Aldrich Chemical Company in 45 grams of water, using an incipient wetness technique. The material was dried for three hours at 120° C. (248° F.) and calcined one hour at 700° C. (1,292° F.) in air. The composition was approximately 11% $CeO_2/Al_2O_3$. This material was crushed and sieved to 14/60 mesh (API).

EXAMPLE 2

A magnesium aluminate sorbent was prepared, starting with two solutions. Solution I contained 461.5 grams magnesium nitrate, 68.6 grams of concentrated nitric acid, and 500 mls of water. Solution II contained 209.7 grams sodium aluminate, 10.7 grams sodium hydroxide, and 500 mls of water. To Solution I were added 2 liters of water, and then over a 30 minute period, Solution II. Sodium hydroxide was then added in an amount to bring the pH up to 10.7. The resulting mixture was aged for 16 hours and then filtered. The recovered solids were dried at 170° C. (338° F.) for 12 hours and sized to 14/60 mesh (API). This material had a composition of about $Mg_2Al_2O_5$.

EXAMPLE 3

To make a sorbent with approximately 100 ppm platinum loading, 35 grams of the magnesium aluminate from Example 2 was impregnated using an incipient wetness technique with a solution of 0.013 gram of chloroplatinic acid (37% Pt. assay) in 16 mls of water. The resulting solids were calcined in air at 450° C. (810° F.) for three hours and sized to 14/60 mesh (API).

EXAMPLE 4

A sorbent with approximately 10% ceria loading on magnesium aluminate was prepared by adding a solution of 9.71 grams cerium nitrate in 16 mls of water to 35 grams of magnesium aluminate from Example 1, using an incipient wetness method. The material was then dried for three hours at 120° C. (248° F.), calcined in air one hour at 700° C. (1,292° F.), and sized to 14/60 mesh (API).

To test the sorbents' ability to sorb sulfur oxides from a gas mixture simulating an incinerated Claus tail-gas, 6 grams of each material described in Examples 1–4 were loaded in an 11 mm I.D. quartz reactor with a central thermowell. The reactor was placed in a radiant furnace for rapid heating and cooling. A gas flow of 360 cc/minute with a composition of 1% sulfur dioxide, 4% oxygen, and 95% nitrogen (on a dry basis) was established through the reactor, after the desired sorption temperature was attained. Water, in the amount of about 20% of the gas flow, as added by directing part of the feed gases through a saturator held at about 150° F.

The sulfur dioxide content in the effluent stream was monitored with a Siemens Ultramat 22P infrared analyzer. A cold trap between the reactor and the analyzer removed most of the water on the effluent stream. Sorption experiments were terminated when the sulfur dioxide level in the effluent exceeded 250 ppm. Sulfur dioxide breakthrough was relatively sharp. In general, the analyzer detected no sulfur dioxide for the first 80–90% of the sorption period. Sulfur dioxide concentration of less than 2 ppm during this portion of the sorption was confirmed by measurements with Drager gas measurement tubes. The calculated weight percentage uptake of sulfur oxide as $SO_3$ during the sorption period is reported in the following Table 2.

Regeneration of the solid sorbent was accomplished by contacting it with hydrogen, which was bubbled through a saturator to obtain about 25% water vapor content. The composition of the off-gas during reductive regeneration was determined by injections onto a Hewlett-Packard 5890 gas chromatograph equipped with a thermal conductivity detector. Usually, both hydrogen sulfide and sulfur dioxide could be detected in the off-gas, but typically one gas or the other dominated, depending on the sorbent and on operating conditions, as indicated in the following Table.

TABLE 2

| Sorbent Material Identity | Temperature of Sorption and Regeneration, °F. | Wt % Uptake During Sorption | Dominate Sulfur Compound In Regeneration Off-Gas |
|---|---|---|---|
| $CeO_2/Al_2O_3$ (Ex. 1) | 1,000 | 4.8 | $H_2S$ |
| $CeO_2/Al_2O_3$ | 1,200 | 6.2 | $SO_2$ |
| $Mg_2Al_2O_5$ (Ex. 2) | 1,200 | 4.7 | $H_2S$ |
| $Pt/Mg_2Al_2O_5$ (Ex. 3) | 1,200 | 33.8 | $SO_2$ |
| $CeO_2/Mg_2Al_2O_5$ (Ex. 4) | 1,100 | 14.7 | $H_2S$ |
| $CeO_2/Mg_2Al_2O_5$ | 1,200 | 25.2 | $SO_2$ |

The uptake of SOx was greater for $Mg_2Al_2O_5$ promoted with Pt (Ex.3) and with $CeO_2$ (Ex.4) was higher than for $Mg_2Al_2O_5$ alone (Ex.2). For the ceria-promoted materials of Examples 1 and 4, magnesium aluminate was a more effective sorbent than alumina, and increasing the operating temperatures from 1,000° F. to 1,200° F. (Ex.1), and from 1,100° F. to 1,200° F. (Ex.4) increased SOx sorption which shifted the dominant off-gas sulfur species from $H_2S$ to $SO_2$.

EXAMPLE 5

The carbon monoxide oxidation activity of two sorbents was tested by flowing a mixture of 4% carbon monoxide, 4% oxygen, and 8% carbon dioxide at a flow rate of 310 cc/min over 6 grams of each material in an 11 mm I.D. quartz reactor. Carbon monoxide and carbon dioxide concentration, as a function of reactor temperature, were monitored by Beckman Model 864 infrared analyzers. With the magnesium aluminate of Example 2, carbon monoxide was half converted at about 770° F. and substantially all converted at 860° F. With the platinum-promoted magnesium aluminate of Example 3, carbon monoxide was half converted at about 510° F. and substantially all converted at 540° F. With an empty reactor, there was no detectable carbon monoxide conversion for temperatures up to 1,200° F.

This example demonstrates that the designated sorbents are effective in promoting the removal of carbon monoxide in the presence of oxygen.

Application Ser. No. 07/868,432, filed Apr. 15, 1992, now U.S. Pat. No. 5,229,091, by J. S. Buchanan, D. L. Stern, J. F. Sodomin and G. T. Teitman for Process for Desulfurizing Claus Tail-Gas is incorporated herein by reference. Application Ser. No. 07/868,432 relates to a process for extracting sulfur from a gas containing hydrogen sulfide and sulfur oxides.

While the invention has been described in conjunction with specific embodiments thereof, it is evident that many alternatives, modifications, and variations will be apparent to those skilled in the art in light of the foregoing description. Accordingly, it is intended to embrace all such alternatives, modification, and variations as fall within the spirit and broad scope of the appended claims.

What is claimed is:

1. A method of recovering sulfur from a gas stream formed by a tailgas stream from a sulfur recovery unit containing hydrogen sulfide comprising the steps of:
   (a) adding air or oxygen to said hydrogen sulfide containing gas stream;
   (b) after step (a) and with no added fuel gas, oxidizing said hydrogen sulfide containing gas stream in a indirect gas-to-gas heat exchanger, said heat exchanger being heated with heat generated in a thermal converter section of a sulfur recovery unit to convert the hydrogen sulfide in said hydrogen sulfide containing gas stream to sulfur oxide, the air or oxygen being added in an amount to support conversion of all of the hydrogen sulfide in said hydrogen sulfide containing gas stream to sulfur oxide, and thereby form a sulfur oxide enriched gas stream;
   (c) contacting said sulfur oxide enriched gas stream with a solid adsorbent bed for adsorbing thereon the sulfur oxides in the form of inorganic sulfates or sulfur oxides or combinations thereof, and thereby form a sulfur oxide depleted stream;
   (d) contacting said adsorbent bed with a reducing gas stream to regenerate said adsorbent bed by reducing said retained inorganic sulfates or sulfur oxides or combinations thereof to hydrogen sulfide and/or sulfur dioxide, and thereby form a hydrogen sulfide and/or sulfur dioxide bearing stream; and
   (e) recovering sulfur from said hydrogen sulfide and/or sulfur dioxide bearing stream.

2. The method of claim 1 wherein said sulfur oxide depleted stream is heat exchanged to recover at least 70% of the heat lost by the thermal converter section during said oxidizing step by heat exchange.

3. The method of claim 1 wherein the heat exchange of said oxidizing step also reduces, at least in part, the temperature of the effluent stream from the thermal converter section to a level suitable for entry to a condenser to remove sulfur therefrom prior to conversion in a catalytic reactor of the sulfur recovery unit.

4. The method of claim 1 wherein said hydrogen sulfide bearing gas stream is oxidized at a temperature of from about 900° F. to about 1400° F.

5. The method of claim 1 wherein said reducing gas is hydrogen and/or hydrocarbon, or a mixture of carbon monoxide and hydrogen.

6. The method of claim 1 wherein sufficient oxygen or air is added to said hydrogen sulfide containing gas stream to ensure conversion of hydrogen sulfide to sulfur oxide during heat exchange.

7. The method of claim 6 wherein said sulfur oxide enriched stream contacting said solid adsorbent bed has an oxygen content of from about 0.10 vol % to about 10.0 vol %.

8. The method of claim 7 wherein the oxygen content is from about 2 vol % to about 4 vol %.

9. The method of claim 1 wherein said solid adsorbent bed while absorbing the sulfur oxides thereon is operated at a gas hourly space velocity of from about 500 GHSV to about 20,000 GHSV, a pressure of from about 0.1 atmospheres to about 10.0 atmospheres, and a temperature of from about 900° F. to about 1400° F.

10. The method of claim 9 wherein the GHSV is from about 3,000 to about 5,000.

11. The method of claim 9 wherein said temperature is from about 1,100° F. to about 1,300° F.

12. The method of claim 9 wherein said pressure is from about 1.5 atmospheres to about 3.0 atmospheres.

13. The method of claim 1 wherein said solid adsorbent bed while being regenerated is operated at a temperature of from about 900° F. to about 1,400° F. at a pressure of from about 0.10 atmospheres to about 10.0 atmospheres, and a gas hourly space velocity of 10 GHSV to about 1,000 GHSV.

14. The method of claim 13 wherein said temperature is from about 1,100° F. to about 1,300° F.

15. The method of claim 13 wherein said pressure is from about 0.5 atmospheres to about 3.0 atmospheres.

16. The method of claim 13 wherein said GHSV is from about 100 to about 150.

17. The method of claim 1 wherein said sulfur oxide enriched stream is passed through a heat exchanger for maintaining the temperature of said sulfur oxide enriched stream in a range of from about 900° F. to about 1,400° F. for contacting said solid adsorbent bed.

18. The method of claim 1 wherein at least two fixed-bed reactors include the solid adsorbent in respective beds, said sulfur oxide enriched stream is fed to a first one of said reactors until the bed therein is spent with inorganic sulfates or sulfur dioxides or combinations thereof; thereafter said sulfur oxide enriched gas stream is fed to a second one of said reactors, and said hydrogen and/or hydrocarbon bearing gas stream is fed to said first one of said reactors to form said hydrogen sulfide and/or sulfur dioxide bearing stream and thus regenerates said first one of said reactors.

19. The method of claim 18 wherein said sulfur oxide enriched gas stream and said hydrogen and/or hydrocarbon bearing gas stream are alternately fed to each one of said reactors, wherein each bed is first spent with said inorganic sulfates or sulfur dioxides or combinations thereof absorbed thereon from said sulfur oxide enriched gas stream and then regenerated by said hydrogen and/or hydrocarbon bearing stream to form said hydrogen sulfide and/or sulfur dioxide bearing stream.

20. The method of claim 1 wherein said solid adsorbent bed is in a fluidized bed system comprising a reactor, a regenerator, a conduit for feeding spent adsorbent from the reactor to the regenerator, and another conduit for passing regenerated adsorbent from the regenerator to the reactor; and wherein said sulfur oxide enriched gas stream is fed to the reactor to absorb said inorganic sulfates or sulfur dioxides or combinations thereof on the fluidized adsorbent therein, and said hydrogen and/or hydrocarbon bearing stream is fed to the regenerator to reduce said inorganic sulfates or sulfur oxides or combinations thereof on the fluidized adsorbent therein to form said hydrogen sulfide and/or sulfur dioxide bearing stream.

21. The method of claim 1 wherein the solid adsorbent is alumina impregnated with a rare earth.

22. The method of claim 1 wherein the solid adsorbent is Mg/Al spinels.

23. The method of claim 1 wherein the solid adsorbent is magnesium, aluminum-containing spinel impregnated with vanadium and cerium.

24. The method of claim 1 wherein the solid adsorbent is magnesium aluminate impregnated with an oxygen promoter.

25. The method of claim 24 wherein said promoter is $CeO_2$ and/or Pt.

26. A method of desulfurizing a hydrogen sulfide containing tailgas stream from an elemental sulfur recovery unit which comprises (1) a thermal converter section including a furnace for combusting a refinery gas stream having a high concentration of hydrogen sulfide to convert at least about one-third of the hydrogen sulfide therein to sulfur dioxide and to combust hydrocarbon gas therein, and a waste heat boiler powered by said furnace for making high pressure steam, and (2) a plurality of serially connected stages downstream of said thermal converter section, each stage including a catalytic reactor for converting hydrogen sulfide and sulfur dioxide in the combusted refinery stream to sulfur and a condenser for recovering sulfur, with the condenser in the last stage providing said tailgas stream; said method comprising the steps of:

(a) adding air or oxygen to said tailgas stream;

(b) after step (a) and with no added fuel gas, oxidizing said tailgas stream at a temperature of from about 900° F. to about 1400° F. in an indirect gas-to-gas heat exchanger, said heat exchanger being heated with heat generated in said waste heat boiler for converting all of the hydrogen sulfide in said tailgas stream to sulfur oxide, the air or oxygen being added in an amount to support conversion of the hydrogen sulfide in said tailgas stream to sulfur oxide and thereby form a sulfur oxide enriched gas stream;

(c) contacting said sulfur oxide enriched gas stream with a solid adsorbent bed for adsorbing thereon the sulfur oxides in the form of inorganic sulfates or sulfur oxides or combinations thereof, and thereby form a sulfur oxide depleted stream;

(d) heat exchanging said sulfur oxide depleted stream to recover at least 70% of the steam generating heat lost by said waste heat boiler during heat exchange in step (b);

(e) contacting said adsorbent bed with a reducing gas stream to regenerate said adsorbent bed by reducing said retained inorganic sulfates or sulfur oxides or combinations thereof to hydrogen sulfide and/or sulfur dioxide, and thereby form a hydrogen sulfide and/or sulfur dioxide bearing stream; and (f) passing said hydrogen sulfide and/or sulfur dioxide bearing stream to said thermal converter section for recovering sulfur therefrom.

27. The method of claim 26 wherein the heat exchange of said oxidizing step also reduces, at least in part, the temperature of the effluent stream from the thermal converter section to a level suitable for entry to a condenser to remove sulfur therefrom prior to conversion in a catalytic reactor of the sulfur recovery unit.

28. The method of claim 27 wherein said refinery gas stream has a concentration of from 50% to 85% of hydrogen sulfide, and wherein said reducing gas is hydrogen and/or hydrocarbon, or a mixture of carbon monoxide and hydrogen.

* * * * *